Dec. 23, 1930.                G. E. A. HALLETT                1,785,899
                        DOUBLE ACTING SHOCK ABSORBER
                            Filed May 21, 1928
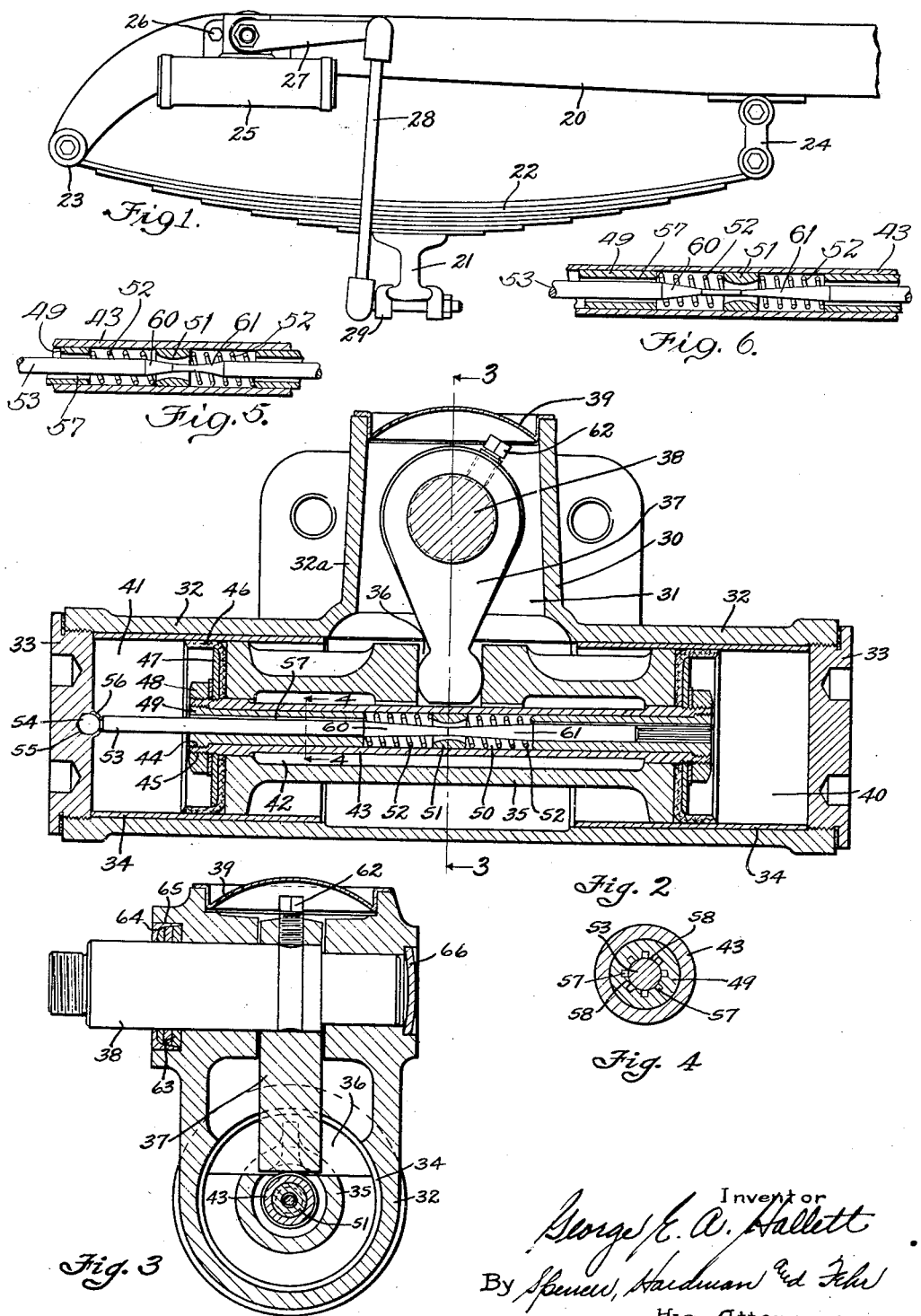
Inventor
George E. A. Hallett
By Spencer, Hardman and Fehr
His Attorneys Patented Dec. 23, 1930

1,785,899

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

DOUBLE-ACTING SHOCK ABSORBER

Application filed May 21, 1928. Serial No. 279,479.

This invention relates to improvements in shock absorbers particularly adapted for use on automotive and other vehicles having a frame or body supported by springs upon the road wheel axles.

It is among the objects of the present invention to provide a simple and compact cushioning device which will operate effectively to dissipate road shocks by cushioning the approaching and separating movements of the frame and axle of the vehicle.

Further objects and adavtanges of the present invention will be apparent from the following description, reference being had to the following description, wherein a preferred embodiment of one form of the present invention is clearly shown.

In the drawings:

Fig. 1 is a diagrammatic fragmentary side view showing the vehicle frame and axle and one form of the present invention applied thereto.

Fig. 2 is a longitudinal sectional view of the shock absorber.

Fig. 3 is a transverse sectional view taken along the line 3—3 of Fig. 2.

Fig. 4 is a fragmentary sectional view taken along the line 4—4 of Fig. 2.

Figs. 5 and 6 are fragmentary sectional views detailedly showing the modified forms of the metering pin and metering ring springs.

Referring to the drawings, the numeral 20 designates the frame of the vehicle which is adapted to support the vehicle body. This frame 20 is supported upon an axle 21 by springs, one of which designated by the numeral 22 being shown hingedly connected to the frame at 23. The other end of the spring is connected to the spring shackle 24 which is hingedly connected to the frame 20. The shock absorber designated in whole by the numeral 25 is secured to the frame by the bolts 26. The shock absorber has an operating arm 27 the free end of which is connected to one end of the rigid connecting link 28, the other end of the link being connected to the axle 21 by a clamp 29.

It will be seen that when the spring 22 is flexed toward the frame 20, due to the road wheels of the vehicle striking an obstruction in the roadway, link 28 will move the lever 27 in a counter-clockwise direction, the return movement of spring 22, away from the frame 20, moving the lever 27 in a clockwise direction.

The shock absorber comprises a casing 30 presenting a fluid chamber 31 which includes a cylindrical portion 32 and a central barrel shaped portion 32a. Each end of the cylindrical portion is provided with an end cover 33 screw-threaded into its cylinder end, each end cover having a gasket interposed between it and its cylinder end to prevent fluid leaks. The cylindrical portion 32 may be provided with a liner 34 of any suitable material, shown in two portions in the present instance.

Within the liners 34 there is provided a reciprocative plunger 35 having a central aperture 36, substantially intermediate the ends of the plunger, which is adapted to receive the free end of the plunger operating arm 37. This arm is secured to a transverse shaft 38, rotatably supported in the walls of the casing, one end of said shaft 38 extending outside the casing and having the shock absorber operating arm 27 attached thereto. A top cover member 39 is provided for the casing portion 32a.

The plunger 35 forms a reciprocative piston in the cylinder, which, when normally held in central position intermediate the cylindrical portion 32 of the casing, as shown in Fig. 2, provides chambers 40 and 41 in said cylindrical portion on opposite sides of the plunger. Inasmuch as both ends of the plunger are constructed alike, one end only will be described.

The plunger has a longitudinal passage 42 substantially coaxial thereof in which is provided a tube 43, the ends of which extend beyond the ends of the plunger and provided with interior and exterior threads 44 and 45 respectively. A cup-shaped fibrous or leather washer 46 provided on the end of the plunger fits snugly within the cylindrical liner 34, said cup-shaped washer being held in position upon the end of the plunger by means of a retaining washer 47 and a clamping nut 48, which nut screw threadedly engages the outer screw threads 45 on the tube 43. Inasmuch as the same structure is provided at the opposite end of the plunger, these two will have a clamping effect tending to hold their respective fibrous washers against the respective ends of the plunger. Within the tube 43 there is provided a tubular bushing 49 having a screw threaded end engaging the inner threads 44 of the tube 43. This end of the tubular bushing is notched to receive a tool for screwing it into the tube 43. The inner end of the tubular bushing 49 terminates a distance from the midway position between the ends of the plunger so that between the inner ends of the opposed tubular bushings 49 of the plunger there is provided a space 50 inside the tube 43. Within this space the metering ring 51 is slidably supported, the inner cross sectional contour of said metering ring 51 being shaped in the form of an hour-glass so that midway between the ends of said metering ring there is a restricted throat portion which gradually widens as it approaches the respective ends of the ring. On each side of the metering ring 51 there is provided a spring 52, each spring engaging the ends of the tubular bushings 49 and the respective ends of the metering ring 51 and tending to hold the metering ring 51 substantially midway between the ends of the tubular bushings 49.

One end of the cover members 33 of the casing supports a metering pin 53, shown in Fig. 2 as having a spherical head 54 fitting into a recess 55 in the end cover member and having a portion of the end cover member 56 spun or pressed about the head 54 so that the pin is swivelly connected with the end cover member. In the Fig. 4 the tubular bushing 49 is shown in cross section. This view shows the inner surface of the tubular bushing provided with longitudinal grooves 57 presenting spaced tongues 58, the inner surface of said tongues forming a bearing which slidably supports the metering pin 53, the grooves 57 forming fluid passages along the outer surface of the pin 53. This structure provides a guide-way for the pin, having substantially little friction. The pin as shown in Fig. 2 extends also into the right-hand tubular bushing 49, said pin being of such a length that it will always be within said right-hand tubular bushing even though the plunger moves to the extreme right-hand position of the cylinder. Two converging tapered portions 60 and 61 are formed on the pin 53 so that their point of meeting will be substantially on the center line 3—3 of the casing, thus when the plunger 35 is in its intermediate position, which is a normal position as shown in Fig. 2, the metering ring 51 which surrounds the pin 53 will be centrally aligned of the tapered portions 60 and 61 so that in this normal position the metering pin and ring 53 and 51 respectively will present the maximum opening for fluid flow through the plunger tubes.

As shown in the Fig. 3, the cross shaft 38 has the plunger operating member 37 secured thereto by a set screw 62, one end of the cross shaft 38 extending from the casing in order to permit attachment of the shock absorber operating arm 27. A leak-proof gasket including cork or fibrous washers 63 and a retainer collar 64 is provided in a recess 65 about the shaft 38 to prevent fluid leaks at this point. A plug 66 is provided at the other end of the shaft to prevent fluid leaks at this point.

When the road wheels of the vehicle strike a small obstruction, spring 22 will be moved a slight distance toward the frame 20 causing the link 28 to move the shock absorber operating arm 27 in a direction to rotate shaft 38 counterclockwise, thereby causing the plunger operating arm 37 to move the plunger toward the right as regards Fig. 2. Fluid within the chamber 40 will be forced through the right-hand tubular bushing 49 into the right-hand space of chamber 50 and thence through the orifice between the metering pin and ring 53 and 51 respectively into the left side of chamber 50 and through the left-hand tubular bushing 49 into chamber 41. Slight bumps will not cause sufficient movement of the plunger to move the metering ring 51 noticeably to restrict the flow of fluid. When substantially heavier or greater obstructions are met by the wheels and the springs 22 are flexed a greater degree, then the plunger 35 is moved toward the right a greater distance and consequently as the plunger moves toward the right, metering ring 51 will be moved with said plunger toward the right and along the tapered portion 61 gradually reducing the orifice and thus gradually restricting the flow of fluid therethrough. If the pressure upon the fluid in chamber 40 reaches a predetermined degree, the metering ring 51 will be moved slidably in tube 43 against the effect of the left hand spring 52 thus tending to increase the orifice by moving said ring away from the tapered portion and thus the pressure upon the fluid in chamber 40 will be gradually relieved. Upon the return movement of the spring 22 toward its normal position the connections and the operating arm 27 will rotate the shaft 38 in a clockwise direction and thus arm 37 will move the plunger toward the left. In this case fluid flows from the chamber 41 through the plunger toward and into the chamber 40, this flow being controlled by the metering pin and ring in a manner similar to the above described.

As has been mentioned before, increased pressures, or more specifically excessive pressures, are relieved by the movement of the metering ring 51 relative to the tubular member 43. It will of course be understood that the tapered portions 60 and 61 of the metering pin may be shaped to meet the different characteristics of the vehicle upon which the shock absorber is attached, that is, if the one tapered portion is steeper than the other, the steeper side will more quickly exert a restricting effect on the fluid flow, when approached by the metering ring 51, than will the tapered portion having a more gradual slope. Springs 52 may also be constructed that one spring will have a greater resistance against compression than the opposite spring and thus when the metering ring is pushed against the stiffer spring, its movement will be retarded to a greater degree than when it is moved against the spring more easily compressed. With these changes the shock absorber may be constructed to meet substantially all cushioning requirements.

The simplicity of the design of the present device facilitates commercial production by eliminating complicated machining operations which ordinarily are presented in complicated casing structures. This structure also facilitates assembling and in case that different metering pins or rings are required the operator need only remove the end cover 33 supporting the metering pin 53 and the tubular bushing 49.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid chamber, a plunger in said casing having provision permitting the passage of fluid in both directions therethrough, and metering means in said plunger for controlling the flow of fluid in both directions therethrough, said metering means including a stationary member supported by the casing and a cooperating member movably supported in the plunger.

2. A shock absorber comprising in combination, a cylinder, a plunger in said cylinder, means providing a passage connecting the cylinder chambers at opposite sides of the plunger, and means for restricting the flow of fluid in both directions through said passage, said means including a stationary metering pin extending into said passage and a metering ring slidably supported within said passage.

3. A shock absorber comprising in combination, a casing presenting a cylinder, a hollow plunger in said cylinder, a pin supported by the casing and extending into the hollow plunger, said pin having converging tapering portions within the plunger, and a ring surrounding said pin and slidably carried in the hollow plunger, adapted to cooperate with the pin to restrict the flow of fluid in both directions through the plunger.

4. A shock absorber comprising in combination, a casing presenting a fluid chamber, a plunger in said casing having provision permitting the passage of fluid in both directions therethrough, and metering means in said plunger for controlling the flow of fluid in either direction therethrough, said metering means including a stationary member extending into the plunger and a cooperating member yieldably supported by the plunger and movable relative thereto in response to a certain increase in the pressure upon the fluid flowing through said plunger.

5. A shock absorber comprising in combination, a casing presenting a fluid chamber, a plunger in said casing having provision permitting the passage of fluid in both directions therethrough, and metering means in said plunger for controlling the flow of fluid in both directions therethrough, said metering means including a stationary metering pin supported by the casing and extending into the plunger and a cooperating metering ring surrounding said pin and yieldably supported by the plunger, said ring being movable relative to the plunger in response to a certain increase in the pressure upon the fluid flowing through said plunger.

6. A shock absorber comprising in combination, a casing presenting a fluid chamber having a cylindrical portion, a plunger in said cylindrical portion, a tube extending longitudinally through said plunger, providing for the flow of fluid in both directions through the plunger, a tubular bushing in each end of said tube providing a space in said tube between the inner ends of the tubular bushings, a metering ring in said space, a spring interposed between each end of a tubular bushing and the metering ring, said spring normally holding the ring yieldably intermediate the inner ends of the tubular bushings, and a metering pin supported by the casing and extending into the tubular members and through the metering ring, said pin having converging tapering portions adapted to cooperate with the metering ring to control the flow of fluid in either direction through the plunger tube.

7. A shock absorber comprising in combination, a casing presenting a fluid chamber having a cylindrical portion, a cover for each end of the cylindrical portion, a plunger in said cylindrical portion normally held intermediate the cylinder end covers so as to provide a chamber on each side of the plunger, said plunger having a longitudinal passage, means supported by the casing for operating the plunger in the cylinder whereby fluid is displaced from a chamber at one end of the plunger through said plunger to the chamber at the opposite end of the plunger, and means in said plunger for regulating the fluid flow therethrough, said means including a metering pin carried by one of the end covers and extending into the plunger and having converging tapering portions meeting substantially midway between the end covers of the cylindrical portion of the casing, and a metering ring in said plunger, surrounding the pin and normally held yieldingly midway between the ends of the plunger.

8. A shock absorber comprising, in combination, a cylinder; a plunger in said cylinder, having a longitudinal passage connecting the cylinder chambers at opposite sides of the plunger; and means for restricting the flow of fluid through said passage in both directions, said means comprising a stationary pin extending into said passage and a metering ring supported within said passage so as to be movable with the plunger at certain fluid pressures and movable relative to said plunger at a predetermined higher fluid pressure within said chamber, said metering ring surrounding the pin.

9. A shock absorber comprising, in combination, a cylinder; a plunger in said cylinder, having a longitudinal passage connecting the cylinder chambers at opposite sides of the plunger; a pin carried by the cylinder and extending into said passage; a metering ring in the passage, and surrounding the pin; yieldable means engaging the ring and adapted to hold the ring immovable relative to the plunger at certain fluid pressures within said plunger, said means, however, permitting movement of the ring relative to the plunger in response to comparatively higher pressures within the plunger; and means for operating said plunger.

10. A shock absorber comprising, in combination, a cylinder; a plunger in said cylinder, having a longitudinal passage connecting the cylinder chambers at opposite sides of the plunger; a pin carried by the cylinder and extending into said passage; a metering ring in the passage, and surrounding the pin; a spring engaging each side of the ring and maintaining said ring immovable relative to the plunger at certain fluid pressures within said plunger, said springs, however, yielding at comparatively higher fluid pressures within the plunger to permit movement of the ring relative to the plunger and in a direction opposite to the movement of the plunger; and means for operating said plunger.

11. A shock absorber comprising, in combination, a cylinder; a plunger in the cylinder forming two compression chambers therein; a conduit providing for the transfer of fluid from one compression chamber into the other in response to movement of the plunger; a metering pin extending into said conduit and being immovable relative thereto; means within said conduit, movable with said conduit and relative to said metering pin for increasingly restricting the flow of fluid from one compression chamber into the other, said means being movable relative to the conduit and in a direction opposite to the movement of the plunger, in response to predetermined high fluid pressures to decrease the restricttion of the flow of fluid from one compression chamber into the other; and means for operating the plunger.

12. A shock absorber comprising, in combination, a cylinder, a plunger in said cylinder, means providing a passage connecting the cylinder chambers at opposite sides of the plunger, and means for restricting the flow of fluid through said passage in both directions, said means comprising a stationary metering pin extending into said passage and a metering ring in said passage, surrounding the pin, said ring being movable with the plunger and relative to said pin at certain fluid pressures in said passage, and movable relative to both the plunger and pin in response to substantially higher fluid pressures in the said passage.

13. A shock absorber comprising, in combination, a cylinder, a plunger in said cylinder, having a longitudinal passage therethrough; sealing means at each end of the plunger; a tube in the longitudinal passage of the plunger, said tube extending from each end of the plunger; means attachable to the ends of the tube for securing the respective sealing means to the plunger ends; tubular bushings screw-threaded into each end of the tube so as to provide a space within the tube and between said bushings; a metering pin supported at one end by the cylinder end wall and slidably extending into and through said bushings, said metering pin having converging tapered portions normally in the space between the bushings; grooves in the interior of the bushings, arranged radially thereof and providing fluid passage through said bushings; a metering ring surrounding the tapered portion of the pin and slidably supported within the tube and between the bushings; and a spring interposed between the ring and the respective bushings.

In testimony whereof I hereto affix my signature.

GEORGE E. A. HALLETT.